Aug. 27, 1935.  R. McCLURE  2,012,888
MILK CAN HANDLING TRUCK
Filed April 3, 1935  2 Sheets-Sheet 2
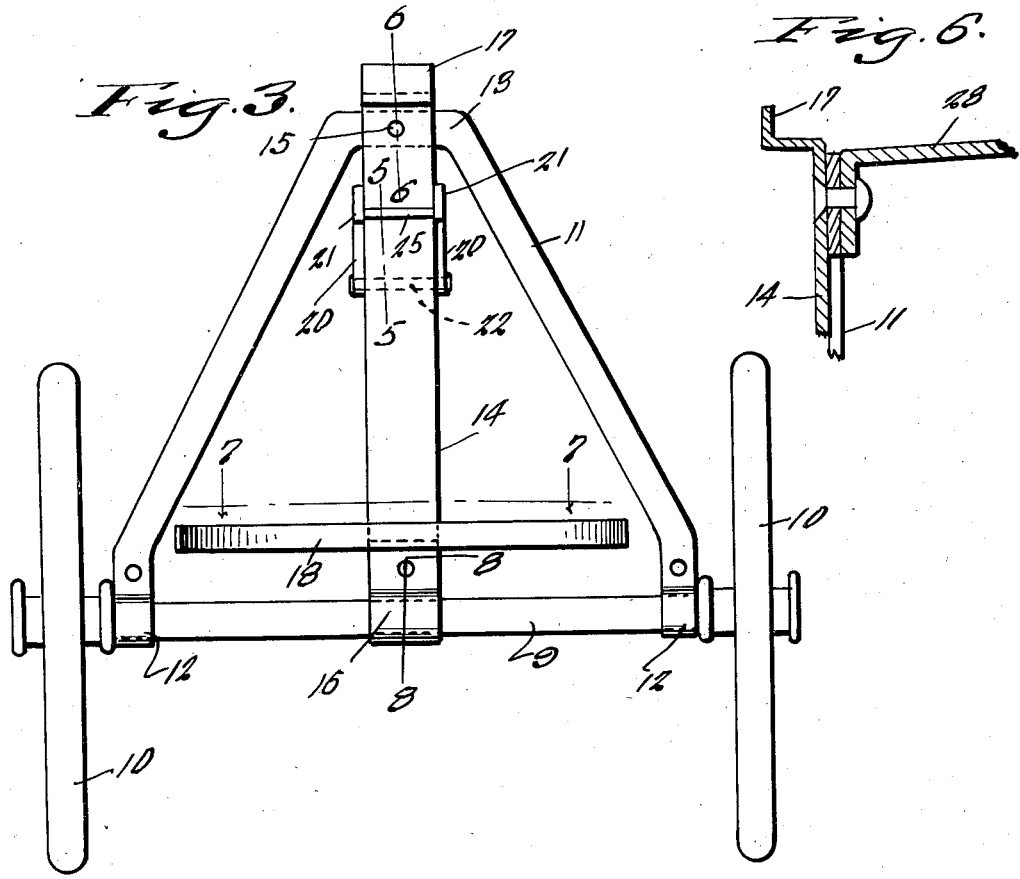
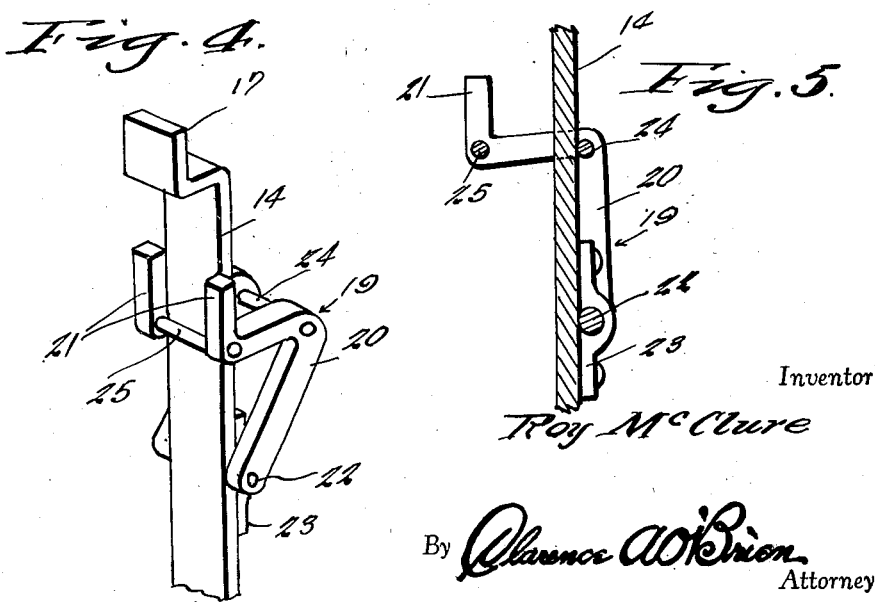
Inventor
Roy McClure
By Clarence A. O'Brien
Attorney Patented Aug. 27, 1935

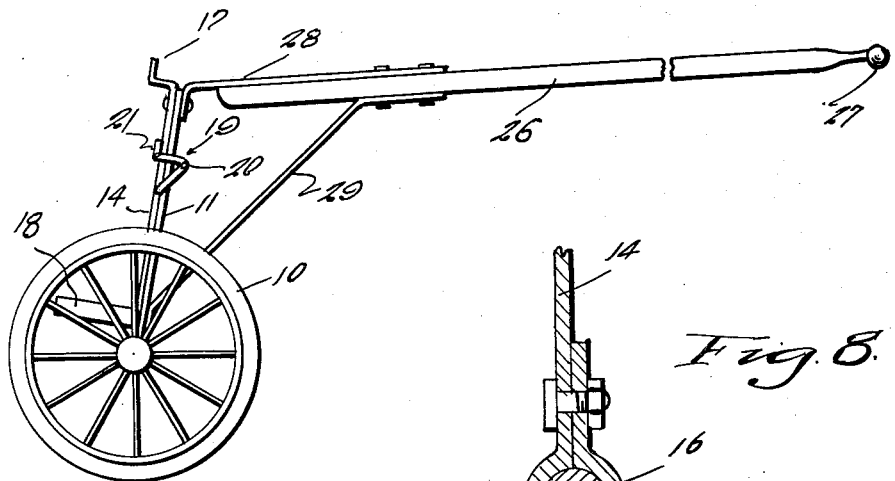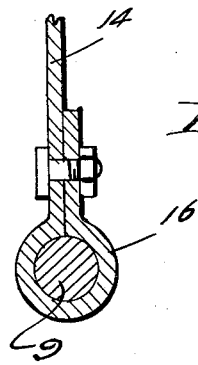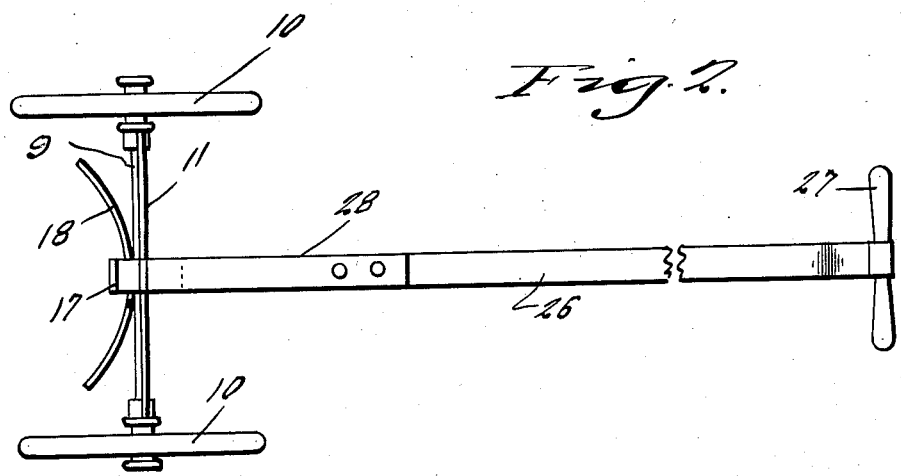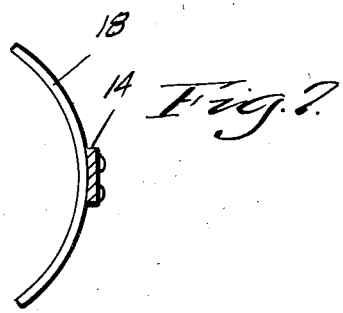

2,012,888

UNITED STATES PATENT OFFICE 2,012,888

MILK CAN HANDLING TRUCK

Roy McClure, Arco, Idaho

Application April 3, 1935, Serial No. 14,533

2 Claims. (Cl. 280—53)

This invention relates to a novel two-wheeled handling and transporting truck which is especially adapted for use in handling milk cans of the relatively large variety used in and around creameries and dairies.

Briefly described, the novel truck comprises a wheel supported axle, an upstanding tiltable frame structure connected thereto, a handle attached by a brace and other means to the frame structure and lifting, retaining and stabilizing means on the frame structure.

One featured improvement has to do with the frame structure itself which comprises a substantially V-shaped yoke having its arm portions swingably connected with the axle, wherein said yoke serves to accommodate a swingable upright or standard as well as a tongue or handle means.

In terms more specific, and by way of contrast with known prior art devices of a similar character, further novelty is predicated on the so-called upright or standard which is equipped with upper and lower hooks as well as a substantially semi-circular can embracing member, the lower hook being of a pivoted automatically operable type so that it may be pushed out of the way when the upper hook is used, or easily dropped down to operative position when used for suspending or hanging cans of a smaller variety.

Other features and advantages will become more readily apparent from the following description and drawings.

In the accompanying drawings wherein like numerals are employed to designate like parts throughout the views:

Figure 1 is a side elevational view of a can handling and transporting truck constructed in accordance with the principles of the present invention.

Figure 2 is a top plan view thereof.

Figure 3 is a front elevational view on an enlarged scale, that is a view observing the structure in Figure 1 from left to right.

Figure 4 is a perspective view illustrating a little more emphatically the double hook arrangement.

Figures 5, 6, 7 and 8 are detail sectional views taken on the planes of the lines 5—5, 6—6, 7—7, and 8—8 of Figure 3.

Calling attention first to the general assemblage depicted clearly in Figure 3, it will be observed that the truck proper comprises an axle 9 having idling wheels 10 of suitable type on its ends. This provides the aforesaid two-wheeled carriage or truck. The V-shaped yoke is indicated by the numeral 11 and comprises a metal strap of appropriate proportion having its arms terminating in connecting eyes 12 rockably encircling the axle inwardly of the two wheels. The upper bight or connecting portion of the yoke indicated at 13 is straight across and in a somewhat horizontal plane when the truck is being moved and this serves to permit the upper end of the upright or standard 14 to be riveted or otherwise connected thereto as indicated at 15. This upright is in the form of a flat metal strap of appropriate strength having its lower end fashioned with an eye 16 which is pivotally connected with the axle and which works in unison with the yoke. These parts 11 and 14 go to make up the unit described as the "frame structure". The extreme upper end of the strap or upright 14 is offset as indicated at 17 to provide a stationary hook over which a handle on a relatively large milk can (not shown) may be saddled or hung for carrying purposes. The body portion of the milk can bears against the frame but more particularly is seated in the part-circular keeper 18 rigidly secured to the upright just above the eye 16. Or stated otherwise this part 18 serves as a stabilizing member and embraces the can and prevents it from swinging from side to side during the transportation operation. Where it becomes necessary to handle and carry cans of a smaller size, the automatic hook unit 19 comes into play. This, as shown in Figure 4, comprises a pair of substantially L-shaped members 20 terminating in upstanding prongs or lugs 21 which constitute the hook elements proper. These parts 20 are arranged in spaced parallelism and pivotally attached as at 22 to a bracket 23 on the standard. The numerals 24 and 25 designate cross pins located between the two parts 20 and serving as stops. When the unit 19 is swung back to an out-of-the-way position it occupies the place illustrated in Figure 4 in which position the hook element 21 recedes to a position in relation to the main hook 17 to allow said hook to function without interference from the pivoted or automatic hook 19. When the hook unit 19 is projected for use it occupies the position shown in Figure 5 in which position it may be utilized as a convenient hanger for the handle of a smaller milk can.

In practice, I utilize a suitable handle or tongue 26 having a hand grip 27 at one end and connected by a jointing strap 28 to the crown portion of a yoke 11. In addition I provide a diagonal brace 29 properly attached to the upright and tongue to provide requisite rigidity. This provides for proper distribution of stress and strain and affords a uniformly balanced carriage which, as a unit, is rockably mounted on the axle 9. Under the circumstances, by raising the tongue 19 to an inclined position it is possible to tilt the entire front frame structure to a position inclined toward the floor and to automatically pick up a loaded milk can then swing it back so that the milk can may be suspended from either the hooks 17 or 21 during which time the body portion is seated firmly in the stabilizing or embracing member 18.

The gist of the invention is in the provision of a two-wheeled axle forming a carriage and a tiltable handle equipped frame structure on the axle. The frame structure is unique in that it includes the special parts 11, 14 and the selectively usable upper and lower hangers or hooks 17 and 21 respectively.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a milk can transporting truck of the class described, a wheeled support, a tiltable frame structure thereon, a handle connected with said frame structure, said frame structure including an upright, the upper end of said upright being formed with a fixed hook, a can embracing member attached to the lower portion of said upright, and an automatic can engaging hook unit comprising a pair of opposed parallel hook members pivotally connected to the upright, and a stop element associated with said hook members to limit their forward and rearward swinging movement.

2. In a milk can transporting truck of the class described, a wheeled support, a tiltable frame structure thereon, a handle connected with said frame structure, said frame structure including an upright, the upper end of said upright being formed with a fixed hook, a can embracing member attached to the lower portion of said upright, and a secondary hook member comprising a pair of spaced parallel hook members pivotally mounted at their lower ends on each side of said upright below the fixed hook, spaced parallel stop members connecting the hook members and disposed on each side of the upright for limiting the forward and rearward spring movement of said secondary hook members.

ROY McCLURE.